(12) United States Patent
Wei et al.

(10) Patent No.: US 12,317,214 B2
(45) Date of Patent: May 27, 2025

(54) ENTITIES FOR PROVIDING AN EXTERNAL SERVICE TO A NETWORK

(71) Applicant: HUAWEI TECHNOLOGIES CO., LTD., Guangdong (CN)

(72) Inventors: Qing Wei, Munich (DE); Riccardo Trivisonno, Munich (DE); Clarissa Marquezan, Munich (DE); Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/623,428

(22) Filed: Apr. 1, 2024

(65) Prior Publication Data

US 2024/0251371 A1    Jul. 25, 2024

Related U.S. Application Data

(63) Continuation of application No. 17/404,709, filed on Aug. 17, 2021, now Pat. No. 11,963,124, which is a continuation of application No. PCT/EP2019/053987, filed on Feb. 18, 2019.

(51) Int. Cl.
*H04W 60/00*  (2009.01)
*H04W 8/18*  (2009.01)

(52) U.S. Cl.
CPC ............. *H04W 60/00* (2013.01); *H04W 8/18* (2013.01)

(58) Field of Classification Search
CPC ......... H04W 60/00; H04W 8/18; H04W 8/00; H04W 88/182; H04L 67/56
USPC ...................................................... 455/435.1
See application file for complete search history.

(56) References Cited

U.S. PATENT DOCUMENTS

| | | | |
|---|---|---|---|
| 6,192,250 B1 | 2/2001 | Buskens et al. | |
| 8,553,679 B2 | 10/2013 | Gorti et al. | |
| 2002/0188562 A1 | 12/2002 | Igarashi et al. | |
| 2006/0133385 A1* | 6/2006 | Trossen | H04L 67/02 370/395.52 |
| 2010/0222034 A1* | 9/2010 | Islam | H04W 8/12 455/414.1 |

(Continued)

FOREIGN PATENT DOCUMENTS

| | | |
|---|---|---|
| CN | 109104394 | 12/2018 |
| CN | 109246653 | 1/2019 |

(Continued)

OTHER PUBLICATIONS

3GPP TR 23.791 V16.0.0 (Dec. 2018), "3rd Generation Partnership Project; Technical Specification Group Services and System Aspects; Study of Enablers for Network Automation for 5G (Release 16)," Dec. 2018, 121 pages.

(Continued)

*Primary Examiner* — Don N Vo
(74) *Attorney, Agent, or Firm* — Fish & Richardson P.C.

(57) ABSTRACT

The present disclosure relates to external services provided to a network. One example method includes: obtaining a clone service invocation request from an other network entity, wherein the clone service invocation request includes clone service invocation information of a clone of a service provided by an external network entity, and providing a service invocation request to the external network entity, wherein the service invocation request includes service invocation information.

19 Claims, 3 Drawing Sheets

(56) References Cited

U.S. PATENT DOCUMENTS

| | | | |
|---|---|---|---|
| 2018/0192471 A1 | 7/2018 | Li et al. | |
| 2018/0270778 A1 | 9/2018 | Bharatia | |
| 2018/0375897 A1 | 12/2018 | Kawasaki et al. | |
| 2019/0053010 A1 | 2/2019 | Edge et al. | |
| 2019/0053147 A1 | 2/2019 | Qiao et al. | |
| 2020/0084122 A1* | 3/2020 | Poe | H04L 41/5054 |
| 2023/0396498 A1* | 12/2023 | Singh | H04L 67/51 |

FOREIGN PATENT DOCUMENTS

| | | |
|---|---|---|
| JP | 2015212984 | 11/2015 |
| KR | 20130103646 | 9/2013 |
| RU | 2587650 | 6/2016 |
| WO | 2018093168 | 5/2018 |
| WO | 2019029525 | 2/2019 |
| WO | 2019071584 | 4/2019 |
| WO | 2019076634 | 4/2019 |

OTHER PUBLICATIONS

3GPP TS 23.288 V0.1.0 (Feb. 2019), "3rd Generation Partnership Project; Technical Specification Group Services and System Aspects; Architecture enhancements for 5G System (5GS) to support network data analytics services;(Release 16)," Feb. 2019, 40 pages.

3GPP TS 23.501 V1.3.0 (Sep. 2017), "3rd Generation Partnership Project; Technical Specification Group Services and System Aspects; System Architecture for the 5G System; Stage 2(Release 15)," Sep. 2017, 174 pages.

3GPP TS 23.501 V1.4.0 (Sep. 2017), "3rd Generation Partnership Project; Technical Specification Group Services and System Aspects; System Architecture for the 5G System; Stage 2(Release 15)," Sep. 2017, 151 pages.

3GPP TS 23.502 V1.3.0 (Nov. 2017), "3rd Generation Partnership Project; Technical Specification Group Services and System Aspects; Procedures for the 5G System; Stage 2(Release 15)," Nov. 2017, 215 pages.

3GPP TS 23.502 V1.4.0 (Dec. 2017), "3rd Generation Partnership Project; Technical Specification Group Services and System Aspects; Procedures for the 5G System; Stage 2(Release 15)," Dec. 2017, 259 pages.

China Mobile et al., "23.501: High level description of NF service registration," SA WG2 Meeting #S2-120, S2-172359, Busan, South Korea, Mar. 27-31, 2017, 2 pages.

EPO Communication pursuant to Article 94(3) EPC issued in European Application No. 19706543.6 on Jul. 1, 2022, 6 pages.

Ericsson (Rapporteur), "External and internal exposure," SA WG2 Meeting #123, S2-176986, Ljubljana, Slovenia, Oct. 23-27, 2017, 7 pages.

Ericsson, "Pseudo-CR on Services—TS 29.510—NRF," 3GPP TSG CT4 Meeting #80 C4-175108, Kochi, India, Oct. 23-27, 2017, 3 pages.

Ericsson, "Removing Editor s note on how to register analytic metadata in NRF," SA WG2 Meeting #S2-129, S2-1811073, Dongguan, P. R. China, Oct. 15-19, 2018, 5 pages.

Huawei et al., "Pseudo CR on TS 23.502 for NF registration, update and deregistration," SA WG2 Meeting #122Bis, S2-175781, Sophia Antipolis, France, Aug. 21-25, 2017, 4 pages.

Huawei et al., "Updates to Solution 19," SA WG2 Meeting #129Bis, S2-1812173, West Palm Beach, USA, Nov. 26-30, 2018, 3 pages.

Huawei Technologies, "pCR TR 32.899 Update of Network Capability Exposure," 3GPP TSG SA WG5 (Telecom Management) Meeting #115, S5-175083, Busan, South Korea, Oct. 16-20, 2017, 6 pages.

Huawei, Hisilicon, Orange, "CR for TS 23.501 Extending Exposure Capability to support Analytics Framework," 3GPP TSG-SA WG2 Meeting #132, S2-1903817, Xi'an, China, Apr. 8-12, 2019, 5 pages.

Huawei, HiSilicon, Orange, "pCR for TS 23.288 Clarifying Flexible AF Registration," 3GPP TSG-SA WG2 Meeting #132, S2-1903816, Xi'an, China, Apr. 8-12, 2019, 3 pages.

Huawei, Hisilicon, Orange, "CR for TS 23.502 Updating NEF and NRF Services to Support AF Available Data Registration," 3GPP TSG-SA WG2 Meeting #132, S2-1903818, Xi'an, China, Apr. 8-12, 2019, 9 pages.

Intel Corporation (Rapporteur), "Email discussion report on [104#35] [NR] Positioning SI (Intel)," 3GPP TSG RAN WG2 Meeting #105, R2-1900753, Athens, Greece, Feb. 25-Mar. 1, 2019, 50 pages.

Nokia et al., "Correction to references," 3GPP TSG-SA2 Meeting #127, S2-183659, Sanya, China, Apr. 16-20, 2018, 5 pages.

Nokia et al., "Proposals for coordination between CT3 and CT4 related to the study on service based interfaces," 3GPP TSG CT4 Meeting #77, C4-172031, 3GPP TSG CT3 Meeting #89, C3-172016, Spokane, USA, Apr. 3-7, 2017, 16 pages.

Office Action in Japanese Appln. No. 2021-548610, dated Dec. 5, 2022, 14 pages (with English translation).

Office Action in Japanese Appln. No. 2021-548610, mailed on Dec. 4, 2023, 5 pages (with English translation).

Office Action issued in Chinese Application No. 201880092251.8 on Apr. 12, 2022, 10 pages.

Office Action issued in Indian Application No. 202117038745 on Mar. 10, 2022, 6 pages.

Office Action issued in Russian Application No. 2021127242/07(057404) on Jun. 30, 2022, 13 pages (with English translation).

Orange, Huawei, "Solution to Key Issue #3: Data Collection by subscription to NFs/AFs," 3GPP TSG-SA WG2 Meeting #128, S2-186346, Vilnius, Lithuania, Jul. 2-6, 2018, 8 pages.

PCT International Search report and Written Opinion issued in International Application No. PCT/EP2019/053987 on Sep. 27, 2019, 23 pages.

Samsung, "A solution to provide the available analytic information metadata," SA WG2 Meeting #128b, S2-188511, Sophia Antipolis, France, Aug. 20-24, 2018, 5 pages.

* cited by examiner

ENTITIES FOR PROVIDING AN EXTERNAL SERVICE TO A NETWORK

CROSS-REFERENCE TO RELATED APPLICATIONS

This application is a continuation of U.S. patent application Ser. No. 17/404,709, filed on Aug. 17, 2021, which is a continuation of International Application No. PCT/EP2019/053987, filed on Feb. 18, 2019. All of the afore-mentioned patent applications are hereby incorporated by reference in their entireties.

TECHNICAL FIELD

The present disclosure relates to external services provided to a network. In particular, the disclosure proposes devices (network entities) that are involved in the registration of an external network entity and/or of one or more services provided by the external network entity at another network entity. Further, the disclosure proposes devices (network entities) that are involved in the bridging of service traffic between an external network entity providing one or more services and another network entity consuming the one or more services.

BACKGROUND

An external network entity, like a $3^{rd}$ party (3P) Application Function (AF), may have additional capabilities, which can help a network to provide better services or improve the network operation efficiency. For instance, a Vehicle-to-anything (V2X) application (e.g., a navigation application) may provide User Equipment (UE) trajectory information to a 5G System (5GS). The 5GS can use this information to manage/plan network resources, in order to better satisfy V2X communication service requirements, and to make more efficient usage of network resources. The information could also be used by the 5GS to access the network capability, and to notify the V2X application in advance, if the expected service quality for a V2X communication service is in risk to be degraded. Furthermore, in industry communication use cases, a time monitoring capability from a 3P AF (e.g., a Time Sensitive Network (TSN), real time application) may provide a reference to the 5GS for a better end-to-end latency control.

However, in the current 3GPP Rel. 15 there is foreseen only limited capability exposure from an external AF to the 5GS. In particular, the 5GS supports external exposure of network capabilities, comprising [see TS 23.502 v.1.4.1 section 4.15.1]:
Exposure of network events externally as well as internally towards core network NFs;
Exposure of provisioning capability towards external functions;
Exposure of policy and charging capabilities towards external functions;
Exposure of core network internal capabilities for analytics.
Exposure of provisioning capability towards external functions allows external party to provision of information which can be used for the UE in 5GS.
Further, Network Exposure Function (NEF) services cover only very specific cases (e.g., parameter provision, UE trigger from the AF, etc.) as shown below in Table 1.

TABLE 1

TR 23.501 v. 1.4.1 Table 7.2.8-1 Network Function (NF) Services provided by NEF.

| Service Name | Description | Reference in TS 23.502 [3] |
|---|---|---|
| Nnef_EventExposure | Provides support for event exposure | 5.2.6.2 |
| Nnef_PFDManagement | Provides support for PFDs management | 5.2.6.3 |
| Nnef_ParameterProvision | Provides support to provision information which can be used for the UE in 5GS | 5.2.6.4 |
| Nnef_Trigger | Provides support for device triggering | 5.2.6.5 |
| Nnef_BDTPNegotiation | Provides support for negotiation about the transfer policies for the future background data transfer | 5.2.6.6 |
| Nnef_TrafficInfluence | Provide the ability to influence traffic routing. | 5.2.6.7 |
| Nnef_ChargeableParty | Requests to become the chargeable party for a data session for a UE. | 5.2.6.8 |
| Nnef_AFsessionWithQoS | Requests the network to provide a specific QoS for an AS session. | 5.2.6.9 |

For external parameter provision, there are also severe limitations (see e.g. the detailed procedure in TS 23.502 V1.4.1 section 4.15.6 "External Parameter Provisioning"), in particular:
1. Lack of flexibility: External parameters need to be pre-configured (e.g., by OAM). Currently they are limited to the information related to a single UE or a group of UE. There is no support for service/slice related information. There is also no general procedure to discover newly added external (3P AF) services. A dedicated service definition for different exposure cases is not provided (for complicity of service design).
2. Inefficient communication between 3P AF and 5GS: The 5GS cannot actively ask for the parameters for a certain time period (e.g., working days), with certain granularities (e.g., per UE/per service) and a certain format (e.g., average, maximum, STD variation) per use case of the parameters. Current solutions only include a valid time as parameter of the external parameters.
3. Long latency between information provider and information consumer: In the current procedures, the external parameters are stored at Unified Data Management (UDM) or a Unified Data Storage (UDR), before they go to the actual consumers of external parameters. This is not suitable for cases, in which real time external information is needed.
4. Limited service exposure from 3P AF: External parameter provision is a limited capability of 3P AF. The 3P could provide services to the 5GS, such as to adjust its traffic pattern/configuration, in order to achieve joint optimization with the 5GS consideration End-to-End (e2e) service requirements, and expose 3P events to the 5GS.

In one special case of a Network Data Analytic Function (NWDAF), TR 23.791 defines that data from AFs (3P AFs) can be collected by the NWDAF. However, it is left for further study to define, how the NWDAF may actually know, which 3P AF can be used for data collection, and which data and/or services such AFs offer.

SUMMARY

In view of the above, embodiments of the present disclosure aim to improve the current implementations. An objective is in particular to provide a mechanism that enables an external network entity, e.g. a 3P AF, to expose its service(s) to a network, e.g. to a 5GS. A specific goal is thereby to enable a network entity, e.g. a 5G NF, to discover the service(s) provided by an external network entity. Another specific goal is to enable a network entity, e.g. a 5G NF, to use (consume) the service(s) provided by an external network entity.

The objective is achieved by the embodiments of the disclosure as described in the enclosed independent claims. Advantageous implementations of the present disclosure are further defined in the dependent claims.

In particular, embodiments of the disclosure propose network entities and methods, which support/enable the integration of one or more external services into a network, particularly into a 5GC Service Based Architecture (SBA). Here the external services refers to both services and information provided by the external network entities. A main embodiment is a network entity, e.g. a NEF, which interacts between another network entity and an external network entity. Embodiments of the disclosure relate in particular to a "registration service" for an external network entity or its service(s), and to a "transfer service" for bridging the service traffic between the external network entity and the network entity in the networks. The "registration service" and "transfer service" may be provided by the network entity, e.g. the NEF.

A first aspect provides network entity for supporting registration of an external network entity, and/or of a service provided by an external network entity at another network entity, wherein the network entity is configured to: obtain a first registration information from the external network entity, wherein the first registration information includes a service profile, create a clone of the service based on the first registration information, provide a second registration information to the other network entity, wherein the second registration information includes a clone service profile, obtain a first registration response from the other network entity, and provide a second registration response to the external network entity.

A "service" also includes "information" provided by the external network entity. Thus, the external network entity may also provide "information". Accordingly the "service profile" may be an "information profile", and the "clone of the service" a "clone of the information". The "clone service profile" may accordingly be a "clone information profile".

The clone of the service is a service interface towards the other network entity and also towards the external network entity. Obtaining registration information may generally include receiving a registration request, receiving a subscription request, or performing a registration through configuration. Sending registration information may generally include sending a registration request, sending a subscription request, or performing a registration through configuration. In the configuration cases, the network entity may be configured (for example at startup) by a management entity (for example by the OAM) in the management plane of the network. The registration information can come from the external entity. The first registration response is in particular provided in response to the second registration information.

The network entity of the first aspect enables the external network entity to expose its service(s) to the other network entity in the network. In particular, it also enables the other network entity to discover the service(s) of the external network entity (as the clone service provided by the network entity). Thus, the network can employ the capabilities provided by the external network entity.

In an implementation form of the first aspect, the network entity is a NEF, the other network entity is a Network Repository Function (NRF), and/or the external network entity is a NF, particularly an AF.

In an implementation form of the first aspect, the network entity is further configured to: create correlation information between the network entity and the service and/or external network entity, and store locally.

In an implementation form of the first aspect, the clone service profile is based on the service profile included in the first registration information and/or on profile information of the network entity.

In an implementation form of the first aspect, the clone of the service is a new service or an update of an existing service provided by the network entity.

In an implementation form of the first aspect, the network entity is further configured to create a clone of the service based on configuration information.

In an implementation form of the first aspect, the network entity is further configured to provide to one or more other network entities the second registration information based on configuration information.

In an implementation form of the first aspect, the second registration information further includes restriction information indicating a restriction of the clone service.

In an implementation form of the first aspect, the second registration information is an update of the registration of the network entity.

A second aspect of the disclosure provides an external network entity, in particular an AF, for providing a service to a network entity, and being configured to: provide registration information to the network entity, in particular to a NEF, wherein the registration information includes a service profile, and obtain a registration response from the network entity, wherein the registration response includes correlation information between the network entity and the service and/or external network entity.

Providing registration information may again generally include sending a registration request, sending a subscription request, or performing a registration through configuration. Obtaining registration response may again generally include receiving a registration response, receiving a subscription response, or performing a registration through configuration.

In an implementation form of the second aspect, the external network entity is further configured to: subscribe to the network entity to receive at least one notification from the network entity, and discover one or more services provided by at least one network entity based on the notification.

A third aspect provides a network entity, in particular a NRF, for registering an external network entity, and/or a service provided by an external network entity, wherein the network entity is configured to: obtain a registration information from another network entity, in particular from a NEF, wherein the registration information includes a clone service profile of a clone of the service provided by the external network entity, register the clone service based on the registration information, and provide a registration response to the other network entity.

Obtaining registration information may generally include receiving a registration request, receiving a subscription request, or performing a registration through configuration. Providing a registration response may generally include sending a registration response, sending a subscription response, or performing a registration through configuration.

In an implementation form of the third aspect, the network entity is configured to: expose the clone service to one or more other network entities, in particular NFs, and/or support discovery of the clone service by one or more other network entities, in particular NFs.

A fourth aspect provides a network entity for supporting invocation by another network entity of a service provided by an external network entity, wherein the network entity is configured to: obtain a clone service invocation request from the other network entity, wherein the clone service invocation request includes clone service invocation information of a clone of the service, which is provided by the external network entity, and provide a service invocation request to the external network entity, wherein the service invocation request includes service invocation information.

In an implementation form of the fourth aspect, the network entity is a NEF, the other network entity is a NF, and/or the external network entity is a NF, particularly an AF.

In an implementation form of the fourth aspect, the network entity is configured to: translate the clone service invocation information into the service invocation information.

The clone service invocation can use either a message for an existing service invocation at the network entity (e.g. NEF) or a new clone service invocation at the network entity (e.g. NEF). This may depend on whether the service provided by the external network entity is implemented as an update of one or more existing network entity (e.g. NEF) services, or is a new service generated at the network entity (e.g. NEF).

In an implementation form of the fourth aspect, the network entity is configured to: expose to other network entities the service invocation information based on configuration information.

In an implementation form of the fourth aspect, the network entity is configured to: obtain a service invocation response from the external network entity, translate the service invocation response to a clone service invocation response, and provide the clone service invocation response to the other network entity.

A fifth aspect provides a network entity, in particular a NF, for consuming a service provided by an external network entity, wherein the network entity is configured to: provide a clone service invocation request to another network entity, in particular to a NEF, wherein the clone service invocation request includes clone service invocation information of a clone of the service, which is provided by the external network entity, obtain a clone service invocation response from the other network entity, and consume the clone service based on the clone service invocation response.

In an implementation form of the fifth aspect, the network entity is further configured to: discover the clone service by executing a service discovery at another network entity, in particular a NRF.

A sixth aspect provides an external network entity, in particular a NF, for providing a service to a network entity, wherein the external network entity is external the network and is configured to: obtain a service invocation request from a network entity, in particular from a NEF, wherein the service invocation request includes service invocation information, process the service invocation information, and provide a service invocation response to the network entity.

A seventh aspect of the disclosure provides a method for supporting registration of a service provided by an external network entity at another network entity, wherein the method comprises: obtaining a first registration information from the external network entity, wherein the first registration information includes a service profile, creating a clone of the service based on the first registration information, providing a second registration information to the other network entity, wherein the second registration information includes a clone service profile, obtaining a first registration response from the other network entity, and providing a second registration response to the external network entity.

The method of the seventh aspect can be implemented according to the implementation forms described above for the network entity of the first aspect. Thus, the method and its implementation forms achieves all advantages and effects as described above for the network entity of the first aspect and its implementation forms, respectively.

An eighth aspect provides a method for providing a service to a network entity, the method comprising: providing registration information to the network entity, in particular to a NEF, wherein the registration information includes a service profile, and obtaining a registration response from the network entity, wherein the registration response includes correlation information between the network entity and the service and/or external network entity.

The method of the eighth aspect can be implemented according to the implementation forms described above for the external network entity of the second aspect. Thus, the method and its implementation forms achieves all advantages and effects as described above for the external network entity of the second aspect and its implementation forms, respectively.

A ninth aspect provides a method for registering an external network entity, and/or a service provided by an external network entity, wherein the method comprises: obtaining a registration information from another network entity, in particular from a NEF, wherein the registration information includes a clone service profile of a clone of the service provided by the external network entity, registering the clone service based on the registration information, and providing a registration response to the other network entity.

The method of the ninth aspect can be implemented according to the implementation forms described above for the network entity of the third aspect. Thus, the method and its implementation forms achieves all advantages and effects as described above for the network entity of the third aspect and its implementation forms, respectively.

A tenth aspect provides a method for supporting invocation by another network entity of a service provided by an external network entity, wherein the method comprises: obtaining a clone service invocation request from the other network entity, wherein the clone service invocation request includes clone service invocation information of a clone of the service, which is provided by the external network entity, and providing a service invocation request to the external network entity, wherein the service invocation request includes service invocation information.

The method of the tenth aspect can be implemented according to the implementation forms described above for the network entity of the fourth aspect. Thus, the method and its implementation forms achieves all advantages and effects as described above for the network entity of the fourth aspect and its implementation forms, respectively.

An eleventh aspect provides a method for consuming a service provided by an external network entity, wherein the method comprises: providing a clone service invocation request to another network entity, in particular to a NEF, wherein the clone service invocation request includes clone service invocation information of a clone of the service, which is provided by the external network entity, obtaining a clone service invocation response from the other network entity, and consuming the clone service based on the clone service invocation response.

The method of the eleventh aspect can be implemented according to the implementation forms described above for the network entity of the fifth aspect. Thus, the method and its implementation forms achieves all advantages and effects as described above for the network entity of the fifth aspect and its implementation forms, respectively.

A twelfth aspect provides a method for providing a service to a network entity, wherein the method comprises: obtaining a service invocation request from a network entity, in particular from a NEF, wherein the service invocation request includes service invocation information, processing the service invocation information, and providing a service invocation response to the network entity.

The method of the twelfth aspect can be implemented according to the implementation forms described above for the external network entity of the sixth aspect. Thus, the method and its implementation forms achieves all advantages and effects as described above for the network entity of the sixth and its implementation forms, respectively.

A thirteenth aspect provides a computer program product for storing program code for performing at least one of the methods according to the seventh to the twelfth aspect, when the program code is run by a processor.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
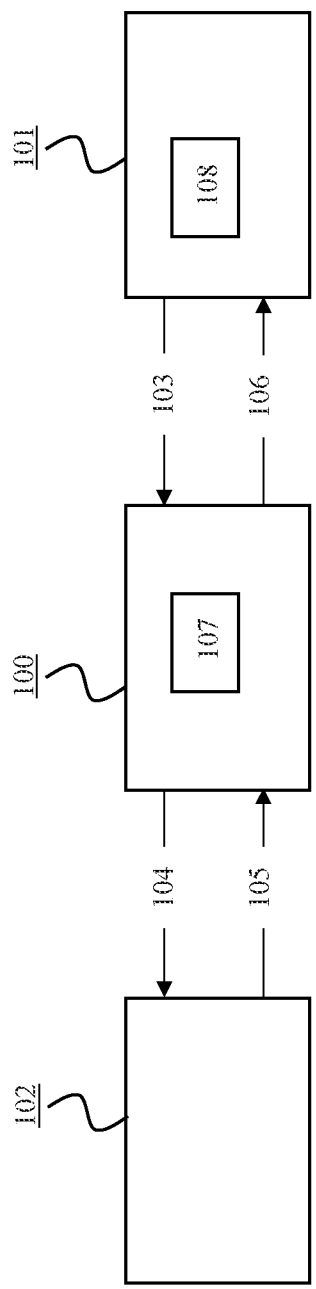
FIG. 1 shows network entities according to embodiments of the disclosure.

FIG. 1 shows a network entity 100 according to an embodiment of the disclosure, an external network entity 101 according to an embodiment of the disclosure, and another network entity 102 according to an embodiment of the disclosure. The network entity 100 is configured to support registration of the external network entity 101 and/or one or more services of the external network entity 101 at the other network entity 102. The external network entity 101 is configured to provide a service 108 to the network entity 100. The other network entity 102 is configured to register the external entity 101 and/or the one or more services 108 of the external network entity 101 (via a clone service 107). The network entities 100, 101 and 102 may be, or may be implemented by, processing circuitry or devices. In particular, the network entities 100, 101, and 102 may be implemented by network devices (e.g. one or more base stations or access nodes) and/or by wireless communication devices (e.g. UEs).

The network entity 100 of FIG. 1 may be a NF, in particular a NEF. The external network entity 101 may be a NF configured to communicate with the other network entity 102 only via the network entity 100, in particular may be an AF. The other network entity 102 may be a NF, in particular a NRF.

The external network entity 101 is configured to provide a first registration information 103 to the network entity 100, wherein the first registration information 103 includes a service profile of the service 108 provided by the external network entity 101. Accordingly, the network entity 100 may obtain the first registration information 103 of the external network entity 101 including the service profile of the service 108. The network entity 100 is then configured to create a clone 107 of the service 108, i.e. a clone service 107, based on the first registration information 103. Further, it is configured to provide a second registration information 104 to the other network entity 102, wherein the second registration information 104 includes a clone service profile of the clone service 107.

Accordingly, the other network entity 102 is configured to receive the second registration information 104 including the clone service profile. The other network entity 102 is configured to register the clone service 107 based on the second registration information 104, and to provide a first registration response 105 to the network entity 100.

The network entity 100 is configured to obtain the first registration response 105 from the other network entity 102, and to provide a second registration response 106 to the external network entity 101. Accordingly, the external network entity 101 is configured to obtain the second registration response 106 from the network entity 100. The second registration response 106 may include correlation information between the network entity 100 and the at least one service 108 of the external network entity 101 and/or the external network entity 101.

In the procedure described with respect to FIG. 1, the network entity 100 may thus serve as an agent for the external network entity 101.

Figure 2:
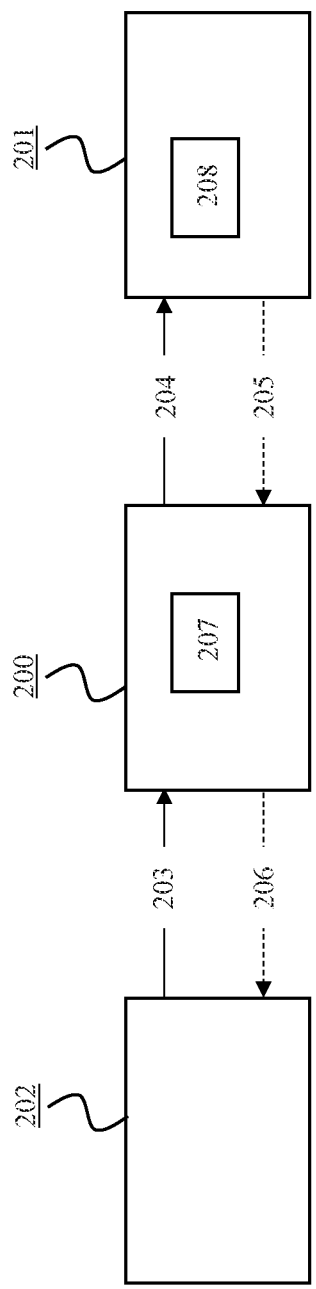
FIG. 2 shows network entities according to embodiments of the disclosure.

FIG. 2 shows a network entity 200 according to an embodiment of the disclosure, an external network entity 201 according to an embodiment of the disclosure, and another network entity 202 according to an embodiment of the disclosure. The network entity 200 may be the network entity 100 shown in FIG. 1. The external network entity 201 may be the external network entity 101 shown in FIG. 1. The network entity 100 is configured to support transfer of service traffic from the external network entity 201 to the other network entity 202. The external network entity 201 is configured to provide a service 208 to the network entity 200. The service 208 may be the service 108. The other network entity 202 is configured to consume the service 208 (via clone service 207, which may be the same as clone service 107) provided by the external network entity 201. The network entities 200, 201 and 202 may be, or may be implemented by, processing circuitry or devices. In particular, the network entities 200, 201, and 202 may be implemented by network devices (e.g. one or more base stations or access nodes) and/or by wireless communication devices (e.g. UEs).

The network entity 200 of FIG. 2 may be a NF, in particular a NEF. The external network entity 201 may be a NF, particularly an AF. The other network entity 202 may be an NF.

The other network entity 202 is configured to provide a clone service invocation request 203 to the network entity 200, wherein the clone service invocation request 203 includes clone service invocation information of the clone service 207 of the service 208 provided by the external network entity 201. Accordingly, the network entity 200 obtains the clone service invocation request 203 from the other network entity 202.

The network entity 200 is configured to provide a service invocation request 204 to the external network entity 201, wherein the service invocation request 204 includes service invocation information for the service 207. The service invocation request 204 may further include correlation information between the network entity 200 and the service 207 provided by the external network entity 201 and/or the external network entity 201. The external network entity 201 is configured to obtain the service invocation request 204 from the network entity 200.

The external network entity 201 may then be configured to process the service invocation information, and to send service invocation response 205 to the network entity 200. The network entity 200 may accordingly be configured to receive the service invocation response 205 from the external network entity 201, to translate the service invocation response 205 to a clone service invocation response 206, and to provide the clone service invocation response 206 to the other network entity 202. The other network entity 202 is configured to obtain the clone service invocation response 206 from the other network entity 200, and to consume the clone service 207 based on the clone service invocation response 206.

In the procedure described with respect to FIG. 2, the network entity 200 may thus serve as an agent for the external network entity 201.

By means of the above-described network entities 100/200, 101/201, 102 and 202, respectively, the integration of at least one external service 108/208 into a network, e.g. a 5GC SBA, is enabled. In particular, this may be realized by providing a "registration service" (FIG. 1) and a "transfer service" (FIG. 2) at the network entity 100/200, which is connected directly to the other network entities 102 and/or 202 in the network, e.g. located in the 5GC SBA, and is also connected to the external network entity 101/201, which hosts the external service(s).

The "registration service" (Nnef_Registration) and the "transfer service" (Nnef_Transfer) can be provided by the network entity 100/200 as shown in the below Table 2. The external network entity 101/201 may, for instance, function to connect a V2X application or a TSN to the 5GC control plane through the network entity 100/200.

TABLE 2

Nnef_Registration and Nnef_Transfer services

| Service Name | Description | Reference in TS 23.502 [3] |
|---|---|---|
| . . . | . . . | . . . |
| Nnef_AFsessionWithQoS | Requests the network to provide a specific QoS for an AS session. | 5.2.6.9 |
| Nnef_Registration | Provides the service for $3^{rd}$ party AF to register at NRF | |
| Nnef_Transfer | Provide the service for 5GS to communication with $3^{rd}$ party AF using SBI | |

The "registration service" may be considered a service of the network entity 100/200, in order to register the external entity 101/201 and/or its service(s) on behalf of the external entity 101/201, and to provide the external service(s) to other network entities 202. External service(s) thereby means that the service(s) is not connected directly to the other network entities 202 consuming the service(s), e.g. network entities in the 5GC SBA framework, and/or that it may have a different service management system/format.

The registration service (service operation "Nnef_Registration") that may be provided by the network entity 100/200 to the external entity 101 is similar to the one provided by NRF described in TS23.501 section 6.2.6 and TS 23.502 Section 5.2.7. The service operation may allow the external network entity 101/201 to register (e.g. via request/response), or to ask for an update (e.g. via request/response), or to deregister (e.g. via request/response). The service operation may be implemented according to the following Table 3:

TABLE 3

Nnef_Registration service

| Service Name | Service Operations | Operation Semantics | Example Consumer(s) |
|---|---|---|---|
| Nnef_Registration | Register | Request/Response | AF |
| | Update | Request/Response | AF |
| | Deregister | Request/Response | AF |

There are envisaged two specific implementation modes for the registration service shown in Table 2 at the network entity 100/200 for registering the external network entity 101/201 and/or its service(s) at the (registration) network entity 102: proxy mode and agent mode. The agent mode is described in this document in detail.

In the agent mode, the network entity 100/200 receives the first registration information 103 from the external entity 101/201, applies the necessary mapping steps (e.g., cloning service(s) 107/207 and mapping information from the first registration information 103 into its own registration information), and creates the second registration information 104 that masks the external service(s) 108/208 as the own (clone) services 107/207 of the network entity 100/200. The effect is that any allowed further network entity 202 (e.g. NF) in the 5GS can discover and invoke service(s) 108/208 from the external entity 101/201 by invoking the clone service 107/207. It will, however, only be able to reach to the network entity 100/200 and will not be able to explicitly distinguish which service(s) (107/207 or 108/208) it is offered by the network entity 100/200, and which ones are exposed by the network entity 100/200 but belong to the external entity 101/201.

The "transfer service" is a service provided by the network entity 100/200 to bridge the communication (e.g. service request/response) between the external network entity 101/201 and a further network entity 202, which is a service consumer (e.g. connected to 5GC SBA framework). There are again two implementation modes for the transfer service at the network entity 100/200: proxy mode and agent mode. The agent mode is described in this document in detail.

In case of the clone of service is implemented as a clone service at the network entity 100/200/300, the network entity 100/200/300 receives a transfer request, i.e. the clone service invocation request 203 (e.g., subscribe/request/notification, etc.) from the further network entity 202 for a cloned service 107/207, which is a clone of a service 108/208 provided by the external network entity 101/201 and is generated during the registration procedure as described above. And the network entity 100/200 further sends the correspondent transfer request, i.e. the service invocation request 204 to the external network entity 101/201.

In case of the clone of service is implemented as an update of existing service at the network entity 100/200, the network entity 100/200/300 receives a transfer request, i.e. the correspondent network service invocation request 303 (e.g., subscribe/request/notification, etc.) from the further network entity 302 for a service 307, which includes a clone of a service 108/208/308 provided by the external network entity 101/201/301 and is updated during the registration procedure as described above. And the network entity 100/200/300 further sends the correspondent transfer request, i.e. the service invocation request 204 to the external network entity 101/201/301.

Table 4 shows the agent mode implementation of the "transfer service" (service operation "Nnef_NEFcloneservice") and related options at the network entity 100/200.

TABLE 4

| Nnef_NEFcloneservice | | | |
|---|---|---|---|
| Service Name | Service Operations | Operation Semantics | Example Consumer(s) |
| Nnef_EventExposure | Subscribe Unsubscribe Notify | Subscribe/Notify | AF, NFs AF, NFs AF, NFs |
| ... | | | |

TABLE 4-continued

| Nnef_NEFcloneservice | | | |
|---|---|---|---|
| Service Name | Service Operations | Operation Semantics | Example Consumer(s) |
| Nnef_NEFcloneservice | request subscribe unsubscribe Notify | Request/Response Subscribe/Notify | 5GS NFs 5GS NFs 5GS NFs AF |

Figure 3:
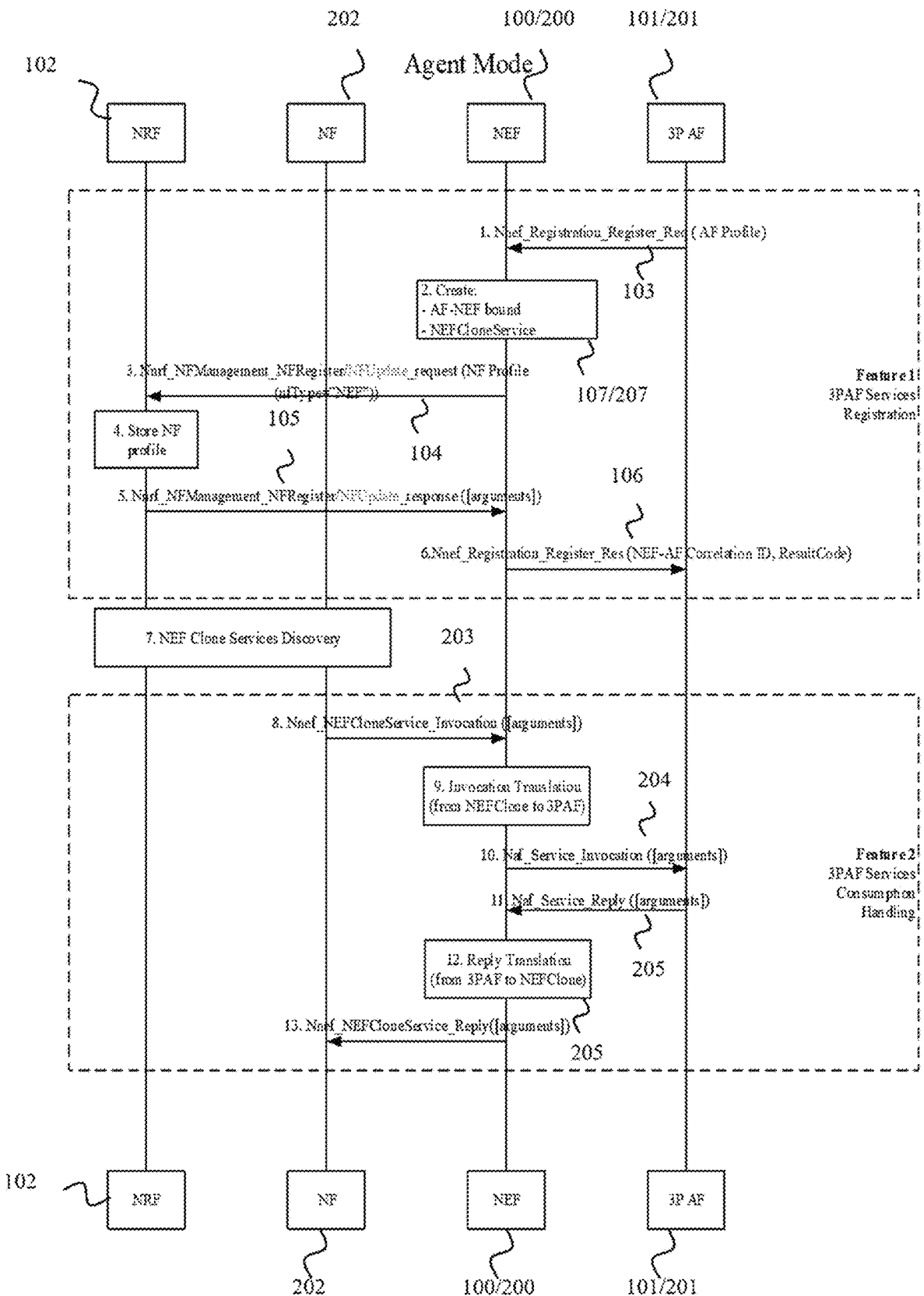
FIG. 3 shows a procedure between network entities according to embodiments of the disclosure.

FIG. 3 shows a procedure between various network entities according to embodiments of the disclosure. In particular, the procedure involves the network entity 100/200 (here a NEF), the external entity 101/201 (here an AF/3P AF), the other network entity 102 (here a NRF), and the other network entity 202 (here a NF). In particular, FIG. 3 shows the procedure in agent mode as described in this document:

The "registration service" (request/response) allows the 3P AF 101/201 to request the NEF 100/200 to register the 3P AF service(s) at the NRF 102, and the NEF 100/200 to register NEF Cloned Services 107/207 at the NRF 102, not including the 3P AF profile. "NEF Cloned Service" refers to a service identical to the service provided by the 3P AF 101/201, but for which the service provider appears to be the NEF 100/200. The 5GS NFs 202 will then be able to discover NEF Cloned Services 107/207 as provided by NEF 100/200.

Upon service discovery, the "transfer service" allows the 5GS NFs 202 to access NEF Cloned Services 107/207, and the NEF 100/200 to relay the service invocation 204 (e.g. request/response or subscribe/notify) to the 3P AF 101/201.

A detailed description of the NEF agent mode embodiment follows. The NEF "registration service" corresponds to steps 1-6 in FIG. 3. The NEF "transfer service" corresponds to the steps 8-13 or messages in FIG. 3.

1. The 3P AF 101/201 requests the registration of its service(s) at the 5GS invoking the Nnef_Registration_Register, including the 3P AF profile in the request (first registration information 103).
2. The NEF 100/200 creates an NEF Clone Service 107/207, i.e. a dummy service produced by the NEF 100/200 replicating the interfaces of the services 108/208 being registered by 3P AF 101/201, and an AF-NEF bound allowing the NEF 100/200 to act as an agent translating the NEF Clone Service 107/207 invocations 203 (received from 5GS NFs 202) into 3P AF service invocations 204, and the 3P AF 101/201 service invocation responses 205 into NEF Clone Service invocation responses 206 (sent to 5GS NFs 202).
3. The NEF 100/200 requests the registration of the NEF Clone Service 107/207 at NRF 102 invoking the Nnrf_NFManagement_NFRegister/NFUpdate_request (second registration information 104), In the NF profile field (service profile), all the AF related info are replaced with NEF related info comparing to the original 3P AF profile, in order to create the clone service profile.
4. The NRF 102 stores the close service profile (e.g. a NEF profile).
5. The NRF 102 acknowledges the NEF request of step 3 sending the Nnrf_NFManagement_NFRegister/NFUpdate_response (first registration response 105) to NEF 100/200.

6. The NEF 100/200 acknowledges the 3P AF request of step 1 sending the Nnef_Registration_Register_Response (second registration response 106) to 3P AF 101/201. This completes the 3P AF service registration at the 5GS, and the corresponding NEF Clone Service registration at the NRF 102. The 5GS NFs 202 may discover the NEF Clone Service 107/207.
7. 5GS NFs 202 may execute a (NEF Clone) Service Discovery procedure. The 5GS NFs 202 may now invoke clone service 107/207 provided by NEF 100/200.
8. The 5GS NF 202 needs to invoke the clone service 107/207 provided by the NEF 100/200. The service request/subscription is created and the 5GS NF 202 invokes the NEF Clone Service 107/207 sending Nnef_NEFCloneService_Invocation message (clone service invocation request 203, e.g. subscribe or request), including NEF Clone Service arguments (clone service invocation information).
9. The NEF 100/200 translates the NEF Clone Service invocation 203 into the corresponding 3P AF Service invocation (service invocation request 204).
10. The NEF 100/200 invokes the 3P AF service 108/208 sending the Naf_Service_Invocation message (service invocation request 203, e.g. subscribe or request), including service arguments derived from NEF Clone Service arguments (service invocation information).
11. The 3P AF 101/201 responds to the service invocation sending the Naf_Service_Reply (service invocation response 205, e.g. response for the subscribe or request) to the NEF 100/200.
12. The NEF 100/200 translates the 3P AF response to service invocation into the NEF Clone Service invocation response (clone service invocation response 206) to be sent to the 5GS NF 202.
13. The NEF 100/200 responds to the NEF Clone Service invocation sending the NEF Clone Service invocation response 206 to the 5GS NF 202, with the Nnef_NEFCloneService_Reply (e.g. response for the subscribe or request) message.

In case of notification from the 3P AF 101/201, similar steps 11a-13a may be triggered from the AF as follows:
11a. The 3P AF 101/201 sends the Naf_Service_Reply (service notification) to the NEF 100/200.
12a. The NEF 100/200 translates the 3P AF notification to NEF Clone Service invocation (close service notification) to be sent to the 5GS NF 202.
13a. The NEF 100/200 sends the NEF Clone Service invocation to the 5GS NF 202, with the Nnef_NEFCloneService_Notify message.

If the NEF 100/200 is implemented as an agent (agent mode), the NFs 202 consider 3P services 108/208 as a service 107/207 provided by the NEF 100/200. The NEF 100/200 generates a clone service 107/207 of the 3P service 108/208 locally. The cloned service 107/207 is invoked instead of the transfer service at the NEF 100/200 to bridge the communication between the 3P AF 101/201 and 5GC NFs 202. The rolls of the NEF 100/200 in the agent option are:
Register the services 108/208 from the 3P AF 101/201 as its own services 107/207 to the NRF 102.
Take care of the service request/subscription from the 5GS NFs 202 for services 108/208 provided by the 3P AF 101/201, and bridge to the 3P AF 101/201.
Take care of the service message from the 3P AF 101/201 and bridge to the 5GS NFs 202 as service response/notification.

The registration operations for the agent mode are similar to the current one for 5GN NF. The difference is just the service profile used in the registration information 104. All the fields indicating NF-related information should be replaced with corresponding NEF-related information. The NEF 100/200 needs to keep the service profile (and e.g. NF profile) of the 3P AF 101/201 locally and map it to the clone service 107/207 by the NEF 100/200 to the NRF 102.

The NEF 100/200 needs to provide the same operation of the service(s) as provided by the 3P party AF 101/201, and forward the service message between the 3P party AF 101/201 and 5GC NFs 202. In case of SBA frameworks being different between the one used by 5GC and the one used by $3^{rd}$ party AF 101/201, the exchanged service message needs to be converted.

The agent mode provides the following advantages:
Changes only at NEF 100/200.
Reusable service registration/consuming procedure.
No NF service profile extension.

In the following, different data structures that are used by embodiments of the disclosure, e.g. as shown in FIG. 3, are explained.
AF Transaction ID (service ID): The ID that uniquely identifies an external service is the AF Transaction ID. This is a coded ID based at least on one of information: on the owner of the 3P AF 101/201 and its service(s), the AF and/or service instance.
NEF-AF Correlation ID (NEF-AF communication channel): Unique identifier for identifying the communications associated with one specific NEF instance and one specific instance of an external service from and AF and/or AF instance.
AF Profile: Contains the same fields as NF Profile (including NS Service):
In the proxy mode, the NF profile may be extended to support the extra information associated with the NF being an AF, which is defined as "AFInfo", which is information that contains at least one of:
A list of designated NEFs 100/200 that are serving as proxy of the 3P AF 101/201 to the SBI.
Associated S-NSSAI with external service(s).
Associated DNNs with external service(s).
Identification of UE IDs (e.g. list of SUPIs) that are associated with the AF 101/201.
Registration Mapping: NEF 100/200, if necessary is configured by OAM with the information to map allowed NF Profile fields to the specific AFs. For instance, in case the AF profile does not contain the allowed S-NSSAI information, the NEF 100/200 may use the registration mapping configuration to further subscribe to NRF 102 with the proper fields of the NF Profile.
MID: Identifier of the message to be exchanged between a 5G NF 202 and external service(s). It is generated by the 5G NF 202 willing to invoke the external service(s) and should uniquely identify the communication associated with the specific container between NF ID, NEF ID, AF Transaction ID.
MRespID: Uniquely identify any message from external service to the NEF 100/200 associated with NEF-AF Correlation ID, Mid.
Mapping for controlling all communications between NF-AF via NEF 100/200: Such a table keeps the mapping (using above described IDs) of NF requests and responses to AF at the level of each Container. If the request from NF triggers multiple Containers from AF 101/201 to NF 202, the NEF 100/200 is able to uniquely identify each one of the answers with the MID and MRespID.

The Nnef_Registration service operation described above can be further extended to include Proxy Status Un/Subscribe/Notify service operations. These service operations enable the external network entity 101/201 to discover services provided by the network entities 202 via the network entity 100/200. This is shown below in Table 5.

TABLE 5

Extended Nnef_Registration service

| Service Name | Service Operations | Operation Semantics | Example Consumer(s) |
| --- | --- | --- | --- |
| Nnef_Registration | AFRegister | Request/Response | AF |
| | AFUpdate | Request/Response | AF |
| | AFDeregister | Request/Response | AF |
| | StatusSubscribe | Subscribe/Notify | AF |
| | StatusNotify | | AF |
| | StatusUnSubscribe | | AF |

For each Nnef_Registration_Register_Req, the NEF 100/200 may perform authorization based on the external entity 101/201, which may result in the restriction of using the service(s) according to preconfigured policy, which is called Registration Mapping. The restriction is reflected in the AFinfo registered in the network entity 102.

For each Nnef_ProxyTransfer_req/subscription, the NEF 100/200 may perform authorization based on the NF/AF pair, which may result in the restriction of using the transfer service (e.g., period of time, maximum transfer amount of data, maximum transfer amount of data per time period, etc.) according to preconfigured policy. The restriction is reflected in the service admission control of the NEFcloneService in the proxy mode.

In summary, the disclosure provides a network entity 100/200 for a 5GS that is configured to:

Support the registration of one or more external services 108/208 (external network entity 101/201) inside the 5GS at a registration network entity 102. The registration can be provided to:

Allow the information of the external service(s) 108/208 to be explicitly available to other network entities 202; or Make the information hidden/masked from other network entities 202.

Register, at the registration network entity 102, the information to support the other network entities 202 to discover external service(s) 108/208 provided by the external network entity 101/201.

Support the exchange of communication(s) between the network entities 202 and the external network entity 101/201, wherein the exchange of communication can be performed in:

Agent Mode: The other network entities 202 communicate with the network entity 100/200 without using reference ID of the external service(s) 108/208 or entity 101/201, wherein:

The other network entities 202 directly communicate with the network entity 100/200 without any knowledge of the external service(s) 108/208.

The network entity 100/200 receives communications from the other network entities 202, maps any reference ID to the external service(s) 108/208, keeps the parameters of the requests/communications from the network entities 202, and forwards the mapped communication to the external network entity 101/201.

The network entity 100/200 receives a communication from the other external entity 101/201, maps the reference ID to the internal network entities 202, keeps the parameter of the communication from the external entity 101/201, and forwards the mapped communication to the network entities 202.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A network entity, comprising:
   at least one processor; and
   one or more memories coupled to the at least one processor and storing programming instructions for execution by the at least one processor to cause the network entity to:
   obtain a clone service invocation request from an other network entity, wherein the clone service invocation request includes clone service invocation information of a clone of a service provided by an external network entity;
   provide a service invocation request to the external network entity, wherein the service invocation request includes service invocation information;
   translate a service invocation response to a clone service invocation response; and
   provide the clone service invocation response to the other network entity.

2. The network entity according to claim 1, wherein:
   the network entity is a Network Exposure Function (NEF),
   the other network entity is a Network Function (NF), or the external network entity is a Network Function (NF).

3. The network entity according to claim 2, wherein the external network entity is an Application Function (AF).

4. The network entity according to claim 1, wherein the one or more memories store programming instructions for execution by the at least one processor to cause the network entity to:

translate the clone service invocation information into the service invocation information.

5. The network entity according to claim 1, wherein the one or more memories store programming instructions for execution by the at least one processor to cause the network entity to:
 expose to other network entities the service invocation information based on configuration information.

6. The network entity according to claim 1, wherein the one or more memories store programming instructions for execution by the at least one processor to cause the network entity to:
 obtain the service invocation response from the external network entity.

7. An external network entity, comprising:
 at least one processor; and
 one or more memories coupled to the at least one processor and storing programming instructions for execution by the at least one processor to cause the external network entity to:
 obtain a service invocation request from a network entity wherein the service invocation request includes service invocation information,
 process the service invocation information, and
 provide a service invocation response to the network entity, wherein the service invocation response is translated to a clone service invocation response.

8. The external network entity according to claim 7, wherein the external network entity is an Application Function (AF).

9. The external network entity according to claim 7, wherein the network entity is a Network Exposure Function (NEF).

10. The external network entity according to claim 7, wherein the external network entity is a Network Function (NF).

11. The external network entity according to claim 7, wherein the one or more memories store programming instructions for execution by the at least one processor to cause the network entity to: provide first registration information to the network entity, wherein the first registration information comprises a service profile.

12. The external network entity according to claim 7, wherein the one or more memories store programming instructions for execution by the at least one processor to cause the network entity to: receive a registration response from the network entity.

13. A method, wherein the method comprises:
 obtaining a clone service invocation request from an other network entity, wherein the clone service invocation request includes clone service invocation information of a clone of a service provided by an external network entity;
 providing a service invocation request to the external network entity, wherein the service invocation request includes service invocation information;
 translating a service invocation response to a clone service invocation response; and
 providing the clone service invocation response to the other network entity.

14. The method according to claim 13, wherein:
 the service invocation request is provided by a Network Exposure Function (NEF),
 the other network entity is a Network Function (NF), or
 the external network entity is a Network Function (NF).

15. The method according to claim 13, further comprising:
 translating the clone service invocation information into the service invocation information.

16. The method according to claim 13, further comprising:
 exposing to other network entities the service invocation information based on configuration information.

17. The method according to claim 13, further comprising:
 obtaining a service invocation response from the external network entity,
 translating the service invocation response to a clone service invocation response, and
 providing the clone service invocation response to the other network entity.

18. A method, wherein the method comprises:
 obtaining a service invocation request from a network entity, wherein the service invocation request includes service invocation information,
 processing the service invocation information, and
 providing a service invocation response to the network entity, wherein the service invocation response is translated to a clone service invocation response.

19. The method according to claim 18, wherein the network entity is a Network Exposure Function (NEF).

* * * * *